(12) United States Patent
Brehm et al.

(10) Patent No.: US 7,335,709 B1
(45) Date of Patent: Feb. 26, 2008

(54) POLYMERIZATE COMPOSITION AND A METHOD FOR PRODUCING THE SAME

(75) Inventors: Helmut Brehm, Krefeld (DE); Hans-Georg Hartan, Kevelaer (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 264 days.

(21) Appl. No.: 10/069,721

(22) PCT Filed: Aug. 2, 2000

(86) PCT No.: PCT/EP00/07480

§ 371 (c)(1),
(2), (4) Date: Feb. 28, 2002

(87) PCT Pub. No.: WO01/16185

PCT Pub. Date: Mar. 8, 2001

(30) Foreign Application Priority Data

Aug. 30, 1999 (DE) ................. 199 41 072

(51) Int. Cl.
*C08F 22/38* (2006.01)
(52) U.S. Cl. .................... 526/59; 526/60; 526/61; 526/78; 526/79; 526/281; 526/292.95; 526/307; 526/307.2; 526/307.7; 526/328.5
(58) Field of Classification Search ............ 526/281.1, 526/292.95, 303.1, 307, 307.2, 307.7, 328.5, 526/59, 60, 61, 78, 79
See application file for complete search history.

(56) References Cited

U.S. PATENT DOCUMENTS

| | | | |
|---|---|---|---|
| 4,654,378 A | | 3/1987 | Hunter et al. |
| 5,902,865 A | * | 5/1999 | Gausepohl et al. ........... 526/64 |
| 6,103,839 A | * | 8/2000 | Patel et al. .................. 526/65 |
| 6,174,978 B1 | * | 1/2001 | Hatsuda et al. ............. 526/240 |
| 6,306,546 B1 | * | 10/2001 | LaFleur et al. ............. 429/324 |

FOREIGN PATENT DOCUMENTS

| | | |
|---|---|---|
| DE | 32 46 905 | 6/1984 |
| DE | 35 44 770 | 6/1988 |
| DE | 35 06 534 | 6/1991 |
| DE | 38 53 101 | 8/1995 |
| DE | 37 06 852 | 5/1996 |
| DE | 38 25 366 | 4/1999 |
| DE | 197 48 153 | 5/1999 |
| EP | 0 553 689 | 8/1993 |
| EP | 0 630 909 | 12/1994 |
| EP | 0 228 638 | 2/1995 |
| EP | 0 296 331 | 2/1995 |
| WO | 95/33697 | 12/1995 |

OTHER PUBLICATIONS

U.S. Appl. No. 10/069,721, filed Feb. 28, 2002, Brehm et al.
U.S. Appl. No. 10/069,278, unknown.

* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention relates to water-soluble, preferably powder-form polymer compositions which are obtained by continuous polymerization of at least one unsaturated monomer. At least one parameter that influences the polymerization is varied according to a recurrent pattern. The invention also relates to the use of the inventive polymer compositions and to a method for producing them.

16 Claims, No Drawings

POLYMERIZATE COMPOSITION AND A METHOD FOR PRODUCING THE SAME

The present invention relates to water-soluble, preferably powdered polymer compositions which can be obtained by continuous polymerization of at least one unsaturated monomer, and to the use thereof. The present invention also relates to a process for producing said polymer compositions.

Polymers of non-ionogenic, anionic and cationic vinyl monomers are being used as flocculants in sewage treatment, ore and coal processing, and in papermaking.

For example, the flocculants are used to speed up the dewatering of solids-bearing sludge liquors such as sewage sludge. Chamber filter presses, centrifuges or screen belt presses or the like are used as dewatering machines.

In order to achieve high throughput rates on the above-mentioned machines with optimum dewatering and clearness of filtrate (centrifugate), type and amount of flocculent must be adjusted carefully to the sludge, because the sludges to be dewatered have varying compositions depending on their origin, e.g. from harbors, ponds or municipal sewage plants.

However, even in the event of one particular type of sludge, changes in the sludge components may alter the dewatering behavior thereof and thus may give rise to insufficient dewatering or increasing turbidity of the filtrate in the case of constant flocculent metering. In particular, these changes become apparent in the sewage purification of mixtures from municipal and industrial waste waters. In the event of changing sewage components, however, simply increasing the amount of flocculant frequently is not sufficient to maintain the quality of dewatering and filtrate.

In such cases, another flocculant having a higher or lower charge or a higher or lower molar weight must be used.

For example, WO 95/33697 suggests a process for dewatering suspensions, wherein two different dewatering aids are metered successively. A low molecular weight, ionic polymer is intended to coagulate the turbidities, while the high molecular weight polymer causes flocculation, the amount of low molecular weight ionic polymer being continuously adjusted to the sludge composition, i.e., to the result of dewatering. Nevertheless, the high molecular weight polymer effecting flocculation must also be adjusted to the sludge with respect to molar weight and charge. According to the above-mentioned patent application, copolymers constituted of from 2.5 mole-% cationic monomer and 97.5 mole-% acrylamide to 65 mole-% cationic monomer and 35 mole-% acrylamide are possible.

The object therefore is to provide a flocculent permitting a wider spectrum of various solids to be separated from suspensions more rapidly and with a higher degree of settling, which flocculent is less sensitive to turbidity changes.

According to the invention, said object is accomplished by providing a water-soluble, preferably powdered polymer composition which can be obtained by continuous polymerization of at least one unsaturated monomer, at least one parameter biasing the polymerization being varied according to a recurrent pattern.

Continuous polymerization is performed according to any process known to those skilled in the art. The polymerization preferably is a solution polymerization. The continuous polymerization preferably is carried out on a moving support as taught e.g. in EP 0,296,331 B1 or EP 0,228,638 B1 which hereby are incorporated by reference and thus are deemed to be part of the disclosure. In EP 0,296,331 B1 or EP 0,228,638 B1, the moving support is a conveying belt onto which an aqueous monomer solution made free of oxygen is metered, which solution undergoes polymerization upon addition of catalyst to form a solid gel, liberating the heat of polymerization. At the end of the conveying belt, the solid gel is removed and preferably crumbled, dried, ground and screened continuously according to well-known procedures.

The monomers to be used can be non-ionogenic, anionic or cationic. Preferred monomers are (meth)acrylic acid and salts thereof, (meth)acrylic acid esters, (meth)acrylic amides, 2-acrylamido-2-methylpropanoic acid and salts thereof, allylsulfonic acid and salts thereof, as well as diallyldialkylammonium chlorides. Particularly preferred monomers are acrylamide, acrylic acid and salts thereof, dialkylaminoalkyl(meth)acrylates and dialkylaminoalkyl (meth)acrylamides as salts or in quaternized form.

The monomers can be polymerized alone in solution or, in order to obtain co- and terpolymer compositions, as a mixture with other monomers. Those skilled in the art will recognize that more than three monomers can also be polymerized together.

The polymerization can be initiated by chemical catalysis and/or high-energy radiation/light (e.g. UV light). Preferred catalysts are organic and inorganic per-compounds such as persulfates and alkyl(hydro)peroxides in combination with reducing substances such as alkali sulfites, optionally with addition of ferrous salts. Preferred photoinitiators are 2,2'-azobis(2-amidinopropane) hydrochloride and/or benzoin derivatives.

According to the invention, at least one parameter biasing the polymerization is to be varied according to a recurrent pattern.

In the meaning of the invention, "according to a recurrent pattern" means that the parameters biasing the polymerization are varied in any desired manner, but at regularly recurring time intervals within a reasonable range familiar to those skilled in the art, and preferably in a continuous fashion.

The pattern preferably is an oscillation about a mean value selectable at random. Said oscillation preferably is harmonic or anharmonic and preferably undamped.

The parameters preferably are varied prior to starting the polymerization, e.g., in the feed of the preferably aqueous monomer solution to the moving support, the following parameters preferably being subject to variation:
a) the composition of the monomer solution in the production of co- and terpolymers by varying the amount of at least one monomer according to a recurrent pattern,
b) the concentration of the monomer solution by varying the metered amount of one monomer of a higher and/or lower concentration according to a recurrent pattern,
c) the amount of catalyst by increasing and reducing the concentration of catalyst or catalyst system according to a recurrent pattern,
d) the amount of molecular weight modifier by increasing and reducing the amount of molecular weight modifier solution according to a recurrent pattern,
e) the pH value of the monomer solution by increasing and reducing the acid or alkali metering according to a recurrent pattern.

Among these parameters, one or more can be varied simultaneously or at time intervals.

Preferably, the pattern is an oscillation about a mean value that can be selected at random. Amplitude and frequency of the oscillation can be selected at random. While the frequency, i.e., the time during which the pattern of varying a polymerization parameter is carried out once, is determined by the sizing of the plant components, the amplitude, i.e., the level of the continuously performed variation, is crucial for the application-technical properties of the polymer composition.

Those skilled in the art will recognize that varying one parameter may result in the variation of other polymerization parameters. When varying the amount of catalyst metering in the reactor feed, for example, the concentration of free radicals in the monomer solution and thus, the polymerization rate on the polymerization belt will be subject to continuous change which can be recognized in an oscillating temperature profile.

In a particularly advantageous fashion, the polymer composition according to the invention can be used in the flocculation preferably of waterborne substances and/or in dewatering of suspensions. Therefore, the present invention is also directed to such uses.

The present invention is also directed to a process for the continuous production of polymer compositions by polymerizing at least one unsaturated monomer, wherein at least one parameter biasing the polymerization is varied according to a recurrent pattern.

The polymerization is performed according to any process known to those skilled in the art. The polymerization preferably is a solution polymerization. However, the polymerization preferably is carried out on a moving support as taught e.g. in EP 0,296,331 B1 or EP 0,228,638 B1 which hereby are incorporated by reference and thus are deemed to be part of the disclosure. In EP 0,296,331 B1 or EP 0,228, 638 B1, the moving support is a conveying belt onto which an aqueous monomer solution made free of oxygen is metered, which solution undergoes polymerization upon addition of catalyst to form a solid gel, liberating the heat of polymerization. At the end of the conveying belt, the solid gel is removed and preferably crumbled, dried, ground and screened continuously according to well-known procedures.

The monomer can be any monomer, preferably an unsaturated monomer. However, preferred monomers are (meth) acrylic acid and salts thereof, (meth)acrylic acid esters, (meth)acrylic amides, 2-acrylamido-2-methylpropanoic acid and salts thereof, allylsulfonic acid and salts thereof, as well as diallyldialkylammonium chlorides. Particularly preferred monomers are acrylamide, acrylic acid and salts thereof, dialkylaminoalkyl(meth)acrylates and dialkylaminoalkyl(meth)acrylamides as salts or in quaternized form.

The monomers can be polymerized alone in solution or, in order to obtain co- and terpolymer compositions, as a mixture with other monomers. Those skilled in the art will recognize that more than three monomers can also be polymerized together.

The polymerization can be initiated by chemical catalysis and/or high-energy radiation/light (e.g. UV light). Preferred catalysts are organic and inorganic per-compounds such as persulfates and alkyl(hydro)peroxides in combination with reducing substances such as alkali sulfites, optionally with addition of ferrous salts. Preferred photoinitiators are 2,2'-azobis(2-amidinopropane) hydrochloride and/or benzoin derivatives.

According to the invention, at least one parameter biasing the polymerization is varied according to a recurrent pattern.

In the meaning of the invention, "according to a recurrent pattern" means that the parameters biasing the polymerization are varied in any desired manner, but at regularly recurring time intervals within a reasonable range familiar to those skilled in the art, and preferably in a continuous fashion.

The pattern preferably is an oscillation about a mean value selectable at random. Said oscillation preferably is harmonic or anharmonic and preferably undamped.

The parameters preferably are varied prior to starting the polymerization, e.g. in the feed of the preferably aqueous monomer solution to the moving support, the following parameters preferably being subject to variation:

a) the composition of the monomer solution in the production of co- and terpolymers by varying the amount of at least one monomer according to a recurrent pattern, b) the concentration of the monomer solution by varying the metered amount of one monomer of a higher and/or lower concentration according to a recurrent pattern, c) the amount of catalyst by increasing and reducing the concentration of catalyst or catalyst system according to a recurrent pattern, d) the amount of molecular weight modifier by increasing and reducing the amount of molecular weight modifier solution according to a recurrent pattern, e) the pH value of the monomer solution by increasing and reducing the acid or alkali metering according to a recurrent pattern.

Among these parameters, one or more can be varied simultaneously or at time intervals.

Preferably, the pattern is an oscillation about a mean value that can be selected at random. Amplitude and frequency of the oscillation can be selected at random. While the frequency, i.e., the time during which the pattern of varying a polymerization parameter is carried out once, is determined by the sizing of the plant components, the amplitude, i.e., the level of the continuously performed variation, is crucial for the application-technical properties of the polymer composition.

Those skilled in the art will recognize that varying one parameter may result in the variation of other polymerization parameters. When varying the amount of catalyst metering in the reactor feed, for example, the concentration of free radicals in the monomer solution and thus, the polymerization rate on the polymerization belt will be subject to continuous change which can be recognized in an oscillating temperature profile.

To carry out said process variant, the continuous polymerization described in EP 0,296,331, Example 4 and FIG. 2 is modified in such a way that the mass flow of catalyst solutions is varied by a regulator via metering valves 28 and 30 according to a preselected pattern at regular time intervals in a recurring fashion.

In a preferred embodiment of the process according to the invention, a constant amount of a catalyst solution is metered into the constant feed flow of an acrylamide solution purged with nitrogen or of a monomer solution of acrylamide and a cationic monomer. A solution of a cationic monomer is metered from another reservoir in an amount continuously varying in the form of a sine-shaped oscillation. As a result of the exothermic reaction, the varying monomer concentration gives rise to a continuously changing temperature in the polymer product on the polymerization belt. Samples taken at the end of the dryer at intervals of 5 minutes clearly show the varying cationic properties oscillating about a mean value.

In another preferred embodiment of the process according to the invention, a molecular weight modifier such as formic acid, acetic acid or isopropanol is metered into a cationic monomer solution and varied according to a recurrent pattern. This procedure results in a polymer composition having a molecular weight range of from low-molecular weight, high-cationic up to high-molecular weight, low-cationic polymer components.

In another preferred embodiment of the process according to the invention, a monomer solution supplied to the polymerization belt at a constant flow and containing a non-ionogenic and a cationic monomer, as well as the catalyst and a molecular weight modifier, is additionally metered with a periodically varying amount of said non-ionogenic monomer. The copolymer obtained not only varies in its composition or charge density according to a recurrent pattern, but also in its molar weight or its solution viscosity.

Another preferred embodiment of the process according to the invention is the production of terpolymer compositions. For example, a constant flow of a monomer solution supplied to the polymerization belt and made up of acrylamide, quaternized dimethylaminopropylacrylamide, at least one catalyst and a molecular weight modifier is metered with an amount of a solution of quaternized dimethylaminoethyl acrylate varying according to a recurrent pattern. In this process variant, the concentrations of molecular weight modifier and catalyst inevitably undergo variations. To avoid this, the solution of quaternized dimethylaminoethyl acrylate also must include molecular weight modifier and/or catalyst.

In another preferred embodiment, the polymerization is performed on two polymerization belts operated in parallel. On the polymerization belts, the parameters biasing the polymerization are varied in a phase-shifted fashion, i.e., when the amount of monomer on the one polymerization unit is about to reach a maximum, the amount on the other polymerization unit is about to reach a minimum. At the end of the polymerization units, the two polymer strands, preferably polymer gels, merely are supplied to a dryer.

By virtue of the above procedure, the amount of polymer supplied to the dryer will be nearly constant, and excessive or insufficient drying in the dryer is avoided. Furthermore, problems in downstream mills resulting from varying water content and thus fluctuating grain elasticity will be reduced.

The polymer composition of the invention has the advantage of easy production and a wide range e.g. of molecular weights and/or ionogenicities. The polymer composition of the invention is particularly suitable as flocculant and/or in dewatering suspensions wherein the polymer composition of the invention allows a wide spectrum of different solids to be removed from suspensions more rapidly and with a higher degree of settling and responds less sensitively to changes in turbidity compared to prior art polymers. A large number of problems related to flocculation and dewatering can be solved using a very small number of polymer compositions.

Using the process according to the invention, it is possible to produce polymer compositions having a wide range of properties. Established processes can easily be adapted to the process of the invention. Expensive control technology required to maintain specific parameters at a constant level is no longer necessary.

The invention will be illustrated with reference to the examples hereinbelow which, however, are not intended to limit the general idea of the invention.

The viscosities and charge densities specified in the examples were determined according to the procedures set forth below.

Determination of the Viscosity:

3.4±0.01 g of product is weighed in a 400 ml beaker. Thereafter, 302.6±0.1 g of demineralized water (22±3° C.) is added in such a way that the product is dispersed in the solvation water without lumps being formed. The solution then requires immediate stirring with a finger blade agitator. The time for dissolution is 60 minutes at 200±10 rpm.

Thereafter, 34±0.1 g of NaCl is added, dispersed for about 1 minute at a speed of 300-500 rpm and dissolved within 15 minutes by additional stirring at 200±10 rpm. After adjusting the temperature to 20±1° C., a spindle No. 1 is immersed slowly without stirring up the solution, and the viscosity is determined on a Brookfield viscosimeter at 10 rpm.

Determination of the Charge Density

The charge density determination is carried out on a particle charge detector PCD 02 from Mütek Co./Herrsching, Germany. In polyelectrolyte titration (Titrator DL 21, Mettler Co.), titration up to the isoelectric point or inflection point is effected using counter-polyions (polyethylene sulfonate Na, polydiallyldimethylammonium chloride).

The titrator provides charge density data in mmol polyion/g polymer. Conversion using the molar mass of the monomer employed furnishes the ionogenicity in weight percent.

The sludge dewatering capability is determined using the procedure described below:

Determination of Dewatering on High Performance Centrifuges 500 ml of a 0.1% polymer solution is sheared for 60 seconds with an Ultra Turrax T 25 N with dispersing tool S 25 N-18G (Janke & Kunkel Co./D-79217 Staufen) at 24,000 rpm. 500 ml of a sludge is mixed in a stirred vessel with the polymer solution with stirring for 10 seconds at 1000 rpm using a 3-finger blade agitator and subsequently placed on a screen having a diameter of 150 mm and a mesh width of 0.2 mm. What is measured is the flow time for 200 ml of filtrate and the clarity of the filtrate using a clarity wedge.

Zero clarity represents no clarification and a clarity of 46 best clarification.

At least three amounts of addition are tested, e.g. 120, 140 and 160 g of polymer per $m^3$ sludge. Depending on the test result, the series is expanded in the direction of less or more polymer.

The following abbreviations will be used throughout the description of the examples:

Abbreviations:

| ACA | Acrylamide |
|---|---|
| ABAH | 2,2'-Azobis(2-amidinopropane) hydrochloride |
| DIMAPA quat. | Dimethylaminopropylacrylamide quaternized with methyl chloride |
| DIMAEA quat. | Dimethylaminoethyl acrylate quaternized with methyl chloride |
| V 80 | Versenex 80 (The DOW Chem. Comp.) |

EXAMPLE 1

The production of an inventive polymer composition from ACA and DIMAPA quat. is effected using continuous photopolymerization. The illuminance is about 2000 µW/cm² at a wavelength of 365 nm.

Batch:

| | |
|---|---|
| 2,250 kg | soft water |
| 660 kg | DIMAPA quat. 60% |
| 3,074 kg | ACA solution 50% |
| 1.4 kg | V 80 |
| ca. 1 kg | sulfuric acid 50% |
| 150 kg | rinsing water |
| 6,136.4 kg | monomer solution, pH: 4 |

The monomer solution purged with nitrogen (oxygen content: 0.6 ppm) continuously flows at 320 kg/h and at a temperature of 0° C. to the polymerization belt. Into this feed 1, the following feeds are metered via a static mixer:

| | |
|---|---|
| Feed 2: | 7 l/h of a 2% ABAH solution |
| Feed 3: | 7.9 l/h of a 1% formic acid |
| Feed 4: | 60% DIMAPA quat. solution, the metering rate of which is varied with a steady increase from 11.5 kg/h to 95 kg/h and with a steady decrease back to 11.5 kg/h over a time period of 60 minutes. This pattern of varying amounts is maintained throughout the entire test period. |

Following a residence time of 40 minutes on a polymerization belt, the solid polymer gel is reduced in size in a meat grinder and dried on a belt dryer at an inlet air temperature of 120° C. in zones 1 and 2, 115° C. in zone 3, and 95° C. in zones 4 and 5.

Samples taken at the end of the dryer at intervals of 5 minutes exhibit the following characteristics:

1. Sampling after a 1 hour test period

| Time (min) | 0 | 5 | 10 | 15 | 20 | 25 | 30 | 35 | 40 | 45 | 50 | 55 | 60 |
|---|---|---|---|---|---|---|---|---|---|---|---|---|---|
| Viscosity (mPa·s) | 640 | 635 | 610 | 625 | 620 | 640 | 600 | 555 | 620 | 670 | 660 | 700 | 650 |
| Ionogenicity (%) | 42.8 | 37.8 | 30.8 | 25.7 | 24.8 | 30.7 | 35.3 | 41.3 | 47.4 | 47.5 | 47 | 44.6 | 41 |

2. Sampling after a 6 hours test period

| Time (min) | 0 | 5 | 10 | 15 | 20 | 25 | 30 | 35 | 40 | 45 | 50 | 55 | 60 |
|---|---|---|---|---|---|---|---|---|---|---|---|---|---|
| Viscosity (mPa·s) | 710 | 610 | 640 | 630 | 650 | 635 | 605 | 610 | 655 | 650 | 650 | 620 | 660 |
| Ionogenicity (%) | 46.5 | 43.3 | 34.5 | 33.2 | 25 | 26.4 | 30.3 | 35.9 | 42.2 | 48.4 | 49.9 | 49.7 | 46.4 |

The milled silo sample screened to 150-1000 μm (mixed sample) has a viscosity of 630 mPa·s and an ionogenicity of 40.9%.

EXAMPLE 2

The production of an inventive polymer composition from ACA and DIMAPA quat. is effected using continuous photopolymerization. The illuminance is about 2000 μW/cm$^2$ at a wavelength of 365 nm.

Batch:

| | |
|---|---|
| 2,120 kg | soft water |
| 1,500 kg | DIMAPA quat. 60% |
| 2,200 kg | ACA solution 50% |
| 1.5 kg | V 80 |
| ca. 2 kg | sulfuric acid 50% |
| 150 kg | rinsing water |
| 5,973.5 kg | monomer solution, pH: 3.8 |

The monomer solution purged with nitrogen (oxygen content: 0.8 ppm) continuously flows at 320 kg/h and at a temperature of 3° C. to the polymerization belt. Into this feed 1, the following feeds are metered via a static mixer:

| | |
|---|---|
| Feed 2: | 7.8 l/h of a 1.5% ABAH solution |
| Feed 3: | 10.9 l/h of a 1.0% formic acid |
| Feed 4: | 60% DIMAPA quat. solution, the metering rate of which is varied with a steady increase from 12.8 kg/h to 95 kg/h and with a steady decrease back to 12.8 kg/h over a time period of 60 minutes. |

-continued

This pattern of varying amounts is maintained throughout the entire test period.

Following a residence time of 45 minutes, the solid polymer gel is reduced in size in a meat grinder and dried on a belt dryer at an inlet air temperature of 115° C. in zones 1 and 2, 110° C. in zone 3, and 95° C. in zones 4 and 5.

Samples taken at the end of the dryer at intervals of 5 minutes exhibit the following characteristics:

| Time (min) | 0 | 5 | 10 | 15 | 20 | 25 | 30 | 35 | 40 | 45 | 50 | 55 | 60 |
|---|---|---|---|---|---|---|---|---|---|---|---|---|---|
| Viscosity (mPa·s) | 435 | 435 | 445 | 450 | 460 | 500 | 500 | 450 | 480 | 470 | 470 | 430 | 425 |
| Ionogenicity (%) | 47.6 | 48.1 | 50.3 | 53.2 | 56.3 | 58.5 | 55.1 | 54.4 | 51.5 | 51.5 | 47.1 | 45.4 | 45.8 |

The milled silo sample screened to 150-1000 μm (mixed sample) has a viscosity of 470 mPa·s and an ionogenicity of 53%. The water content is 10.5%.

EXAMPLE 3

The production of an inventive polymer composition from ACA and DIMAPA quat. is effected using continuous photopolymerization. The illuminance is about 2000 μW/cm² at a wavelength of 365 nm.

Batch:

| 2,150 kg | soft water |
| 3,090 kg | DIMAPA quat. 60% |
| 1,230 kg | ACA solution 50% |
| 0.9 kg | V 80 |
| ca. 2 kg | sulfuric acid 50% |
| 150 kg | rinsing water |
| 6,522.9 kg | monomer solution, pH: 3.8 |

350 kg/h of this monomer solution is cooled to 2° C. in a heat exchanger and made free of dissolved oxygen to a residual content of 0.9 ppm in a stripper through which nitrogen is passed at 3 m³ per hour. Prior to placing on the polymerization belt, the following amounts of solutions are mixed with the above feed 1:

| Feed 2: | 9.6 l/h of a 1.5% ABAH solution |
| Feed 3: | 10.9 l/h of a 1.0% formic acid |
| Feed 4: | 50% ACA solution containing 250 ppm V 80, the metering rate of which is varied with a steady increase from 17 kg/h to 120 kg/h and with a steady decrease back to 17 kg/h over a time period of 60 |

-continued minutes. This pattern of varying amounts is maintained throughout the entire test period.

The polymer gel obtained after 40 minutes is reduced in size and dried as in Example 2.

Samples taken at the end of the dryer exhibit the following characteristics:

| Time (min) | 0 | 5 | 10 | 15 | 20 | 25 | 30 | 35 | 40 | 45 | 50 | 55 | 60 |
|---|---|---|---|---|---|---|---|---|---|---|---|---|---|
| Viscosity (mPa·s) | 440 | 460 | 430 | 440 | 405 | 370 | 350 | 330 | 330 | 330 | 325 | 370 | 420 |
| Ionogenicity (%) | 50.5 | 49 | 47.5 | 49 | 52 | 52.8 | 57.7 | 53.6 | 58.4 | 55.1 | 52.3 | 50.9 | 49.5 |

The silo sample (mixed sample) of the final product has a viscosity of 350 mPa·s and an ionogenicity of 53.0 wt.-%.

EXAMPLE 4

The production of an inventive polymer composition from ACA, DIMAPA quat. and DIMAEA quat. is effected using continuous photopolymerization. The illuminance is about 2000 μW/cm² at a wavelength of 365 nm.

Batch:

| 2,120 kg | soft water |
| 1,500 kg | DIMAPA quat. 60% |
| 2,200 kg | ACA solution 50% |
| 1.5 kg | V 80 |

-continued

| | |
|---|---|
| ca. 2 kg | sulfuric acid 50% |
| 150 kg | rinsing water |
| 5,972.5 kg | monomer solution, pH: 3.8 |

This monomer solution with 320 kg/h constitutes feed 1. It is cooled and purged with nitrogen as in Example 3. Upstream of the polymerization belt, the following feeds are added by mixing:

| | |
|---|---|
| Feed 2: | 7.8 l/h of a 1.5% ABAH solution |
| Feed 3: | 10.9 l/h of a 1.0% formic acid |
| Feed 4: | 80% DIMAEA quat. solution, the metering rate of which is varied with a steady increase from 15 kg/h to 95 kg/h and with a steady decrease back to 15 kg/h over a time period of 45 minutes. This pattern of varying amounts is maintained throughout the entire test period of about 18 hours. |

The gel removed the polymerization belt after a residence time of 45 minutes is reduced in size and dried as in Example 2.

Samples taken at intervals at the end of the dryer exhibit the following characteristics:

| Time (min) | 0 | 5 | 10 | 15 | 20 | 25 | 30 | 35 | 40 | 45 |
|---|---|---|---|---|---|---|---|---|---|---|
| Viscosity (mPa·s) | 555 | 590 | 530 | 585 | 545 | 560 | 530 | 520 | 530 | 550 |
| Ionogenicity (%) | 61.3 | 61.6 | 54 | 50.6 | 48 | 46.8 | 50.3 | 53.5 | 58.6 | 61 |

Downstream of the dryer, the polymer is milled, screened for the grain fraction of from 150 to 1000 μm and fed into a NAUTA mixer. A sample from the mixer has a viscosity of 540 mPa·s and an ionogenicity of 55%.

Application-Technical Examination (Laboratory)

In this example, the dewatering capability of a sewage sludge from a clarification plant is compared when adding the polymer composition of the invention and polymers according to the prior art.

The sludge had a pH value of 7.1 and a dry substance of 3.5 wt.-%.

| | Polymer from Example 3 | | Comparison 1 Praestol ® 644 BC[2] Viscosity: | | Comparison 2 Praestol ® 650 BC[2] Viscosity: | |
|---|---|---|---|---|---|---|
| | Time for | | 365 mPa·s Ionogenicity: 52% | | 370 mPa·s Ionogenicity: 39% | |
| Added amount[1] g/m³ | 200 ml filtrate (s) | Clarity Clarity wedge 0-46 | Time for 200 ml filtrate (s) | Clarity Clarity wedge 0-46 | Time for 200 ml filtrate (s) | Clarity Clarity wedge 0-46 |
| 160 | 29 | 26 | | | | |
| 170 | 25 | 27 | | | | |
| 180 | 18 | 29 | | | | |
| 190 | | | 27 | 31 | | |
| 200 | | | 24 | 33 | | |
| 220 | | | 16 | 34 | | |
| 260 | | | | | 50 | 26 |
| 280 | | | | | 31 | 30 |

[1] Metering from a 0.1% solution.
[2] Non-inventive polymers of ACA/DIMAPA quat. manufactured by Stockhausen GmbH & Co. KG.

The polymer composition of the invention is found to permit removal of solids with virtually constant filtrate clarity and comparable rate, but less polymer employed.

Application-Technical Examination (Clarification Plant)

In this example, sludge from a clarification plant added with the polymer composition of the invention and prior art polymers is dewatered on a centrifuge.

| | |
|---|---|
| Centrifuge: | Type: Westfalia CA 505 Speed: 3520 rpm |
| Sewage sludge: | Amount: 29 m³/h Dry substance: 2.7% |

| | Polymer solution | | Thickened sludge | |
|---|---|---|---|---|
| Polymer | Concentration g/l | Consumption m³/h | DS[3] % | SD[4] % |
| From Example 2 | 5 | 1.31 | 33 | 98.6 |
| Comparison 3 Praestol ®[1] 853 BC | 5 | 1.32 | 26.9 | 98.7 |
| Comparison 43 Praestol ®[1] A 7112 | 5 | 1.30 | 29.3 | 98.7 |

[1] Non-inventive copolymer made up of ACA and DIMAPA quat., viscosity: 460 mPa·s, ionogenicity: 54%; manufacturer: Stockhausen GmbH & Co. KG.
[2] Non-inventive copolymer made up of ACA and DIMAEA quat., viscosity: 505 mPa·s, ionogenicity: 63%; manufacturer: Stockhausen GmbH & Co. KG.
[3] DS = Dry substance
[4] SD = Settling degree $$SD\ (\%) = \frac{DS_{discharge} \times (DS_{feed} - DS_{centrifugate}) \times 100}{DS_{feed} \times (DS_{discharge} - DS_{centrifugate})}$$

The polymer composition of the invention is found to achieve improved sludge thickening with unchanged settling degree and polymer addition.

The invention claimed is:

1. A water-soluble cationic copolymer or terpolymer composition obtained by continuous polymerization of acrylamide and at least one unsaturated cationic monomer selected from the group consisting of quaternized dialkylaminoalkyl(meth)acrylates and quaternized dialkylaminoalkyl(meth)acrylamides, wherein said polymerization is effected on a moving support with a predetermined residence time, and wherein during said polymerization the metering rate of the acrylamide or the at least one unsaturated cationic monomer is varied in the feed to the moving support in a continuous fashion according to an oscillation about a mean value, wherein oscillation is effected by steadily increasing and steadily decreasing back the metering rate over a time period of about 45 to about 60 minutes.

2. The water-soluble cationic copolymer or terpolymer composition according to claim 1, wherein the residence time is within the range of from about 40 to about 45 minutes.

3. The water-soluble cationic copolymer or terpolymer composition according to claim 1, wherein said polymerization is a photopolymerization.

4. The water-soluble cationic copolymer or terpolymer composition according to claim 1, wherein the oscillation is harmonic.

5. The water-soluble cationic copolymer or terpolymer composition according to claim 1, wherein additionally at least one of the following parameters is subject to variation:

a concentration of a monomer,
an amount of a catalyst,
an amount of a molecular weight modifier, or
a composition of said monomer solution.

6. The water-soluble cationic copolymer or terpolymer composition according to claim 1, wherein the composition is in a powdered form.

7. The water-soluble cationic copolymer or terpolymer composition according to claim 4, wherein the oscillation is undamped.

8. A process for treating a suspension, comprising:

adding the water-soluble polymer composition claimed in claim 1 to said suspension, wherein said water-soluble polymer composition flocculates or dewaters said suspension.

9. A method of dewatering sewage, comprising:

adding the water-soluble polymer composition according to claim 1 to said sewage, to remove solids from said sewage at a substantially constant filtrate clarity.

10. The water-soluble cationic copolymer or terpolymer composition according to claim 1, wherein the quaternized dialkylaminoalkyl(meth)acrylate is dimethylaminoethyl acrylate quaternized with methyl chloride and/or the quaternized dialkylaminoalkyl(meth)acrylamide is dimethylamino propyl acrylamide quaternized with methyl chloride.

11. A process for the preparation of a water-soluble cationic copolymer or terpolymer composition, comprising continuously polymerizing acrylamide and at least one unsaturated cationic monomer selected from the group consisting of quaternized dialkylaminoalkyl(meth)acrylates and quaternized dialkylaminoalkyl(meth)acrylamides, wherein said polymerization is effected on a moving support with a predetermined residence time, and wherein during said polymerization the metering rate of the acrylamide or the at least one unsaturated cationic monomer is varied in the feed to the moving support in a continuous fashion according to an oscillation about a mean value, wherein the oscillation is effected by steadily increasing and steadily decreasing back the metering rate over a time period of about 45 to about 60 minutes.

12. The process according to claim 11, wherein the residence time is within the range of from about 40 to about 45 minutes.

13. The process according to claim 11, wherein said polymerization is a photopolymerization.

14. The process according to claim 11, wherein the oscillation is harmonic.

15. The process according to claim 11, wherein additionally at least one of the following parameters is subject to variation:

a concentration of a monomer,
an amount of a catalyst,
an amount of a molecular weight modifier, or
a composition of said monomer solution.

16. The process according to claim 11, wherein the quaternized dialkylaminoalkyl(meth)acrylate is dimethylaminoethyl acrylate quaternized with methyl chloride and/or the quaternized dialkylaminoalkyl(meth)acrylamide is dimethylamino propyl acrylamide quaternized with methyl chloride.

* * * * *